(12) United States Patent
Palmadesso et al.

(10) Patent No.: US 6,947,869 B2
(45) Date of Patent: Sep. 20, 2005

(54) EFFICIENT NEAR NEIGHBOR SEARCH (ENN-SEARCH) METHOD FOR HIGH DIMENSIONAL DATA SETS WITH NOISE

(75) Inventors: Peter J. Palmadesso, Manassas, VA (US); Jeffrey H. Bowles, Alexandria, VA (US); David B. Gillis, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 395 days.

(21) Appl. No.: 10/113,643

(22) Filed: Mar. 29, 2002

(65) Prior Publication Data

US 2003/0187616 A1 Oct. 2, 2003

(51) Int. Cl.[7] ................................................ G06F 7/02
(52) U.S. Cl. ...................... 702/181; 702/182; 702/183; 702/189
(58) Field of Search .............................. 702/49, 57, 76, 702/177, 183, 189, 181; 700/245; 355/18; 382/106

(56) References Cited

U.S. PATENT DOCUMENTS 6,038,344 A * 3/2000 Palmadesso et al. ........ 382/191
6,167,156 A * 12/2000 Antoniades et al. ........ 382/232
6,381,605 B1 * 4/2002 Kothuri et al. ............. 707/100
6,701,021 B1 * 3/2004 Qian et al. .................. 382/253

* cited by examiner

Primary Examiner—Patrick Assouad
Assistant Examiner—Felix Suarez
(74) Attorney, Agent, or Firm—John J. Karasek; L. George Legg

(57) ABSTRACT

A nearer neighbor matching and compression method and apparatus provide matching of data vectors to exemplar vectors. A data vector is compared to exemplar vectors contained within a subset of exemplar vectors, i.e., a set of possible exemplar vectors, to find a match. After a match is found, a probability function assigns a probability value based on the probability that a better matching exemplar vector exists. If the probability that a better match exists is greater than a predetermined probability value, the data vector is compared to an additional exemplar vector. If a match is not found, the data vector is added to the set of exemplar vectors. Data compression may be achieved in a hyperspectral image data vector set by replacing each observed data vector representing a respective spatial pixel by reference to a member of the exemplar set that "matches' the data vector. As such, each spatial pixel will be assigned to one of the exemplar vectors.

26 Claims, 7 Drawing Sheets

EFFICIENT NEAR NEIGHBOR SEARCH (ENN-SEARCH) METHOD FOR HIGH DIMENSIONAL DATA SETS WITH NOISE

CROSS-REFERENCE TO RELATED APPLICATIONS

This application relates to U.S. Pat. No. 6,038,344, issued on Mar. 14, 2000, entitled Intelligent Hypersensor Processing System (IHPS), and U.S. Pat. No. 6,167,156, issued on Dec. 26, 2000, entitled Compression of Hyperdata with ORASIS Multisegment Pattern Sets (CHOMPS), both of which are hereby incorporated by reference.

ORIGIN OF THE INVENTION

This invention was made by employees of the United States Government and may be manufactured and used by or for the Government for governmental purposes without the payment of any royalties.

FIELD OF THE INVENTION

The invention relates to vector data compression methods, which provide for matching of a data vector to an exemplar vector and, in particular, to an improved vector data compression method wherein the data vector is matched to a near neighbor exemplar vector.

BACKGROUND OF THE INVENTION

Conventional near/nearest neighbor matching methods are useful for solving classification problems in compression schemes using vector quantization or similar approaches. Near/nearest neighbor methods match a data vector to an exemplar vector from a set of exemplar vectors.

In a hyperspectral image data set, each spatial pixel is associated with a high-dimensional vector, or spectrum. The dimensionality of the vector is equal to the number of spectral bands, and can be in the hundreds or more. Compression is achieved by choosing a subset of the data, known as exemplars, to represent the full data set. Each of the observed spectra is replaced by a reference to a member of the exemplar set that "matches" it, in a sense to be made precise. The compressed data set then need only include the exemplar vectors, which are a small subset of the total data set, plus, a codebook that is an array that contains the index of the matching exemplar for each spatial location. In addition, the magnitude of the original vector may be recorded also. In general, it may be desirable to record other salient features of the vector if it will improve reconstruction of the data.

There are a number of methods for finding a near or even nearest neighbor of a data vector from a set of exemplar vectors. When both the vector dimensionality and the number of data points to be searched are small, an exhaustive search through the set of exemplar vectors is a practical approach. However, exhaustive searches quickly become prohibitive as either the number of data vectors or the dimensionality of the data increases, and alternative methods must be used. In vectors of two- or three-dimensions, Voronoi diagrams are useful in finding near/nearest neighbors. For vectors having moderate-dimensional spaces, e.g. around 20 or less, a k-d tree data structure provides sufficient efficiency.

These conventional methods are inadequate for many applications involving near/nearest neighbor matching of a large number of vectors in higher dimensional space, e.g. data sets containing tens or hundreds of thousands of vectors with up to several hundred dimensions. This is particularly true in a real time system where is may be necessary to repeat the search many times as new spectra are observed. A typical hyperspectral imager produces 50,000 spectra/s with 128 bands measured. As technology improves both the number of spectra/s and the number of bands measured will increase. Therefore, alternative search/matching methods have been developed for high-dimensional data.

Two previous methods for finding near neighbors in hyperspectral data include the Intelligent Hypersensor Processing System (IHPS) optimized for hyperspectral data, described in U.S. Pat. No. 6,038,344 and the CHOMPS compression system used in ORASIS (Optical Real-time Adaptive Signature Identification System), described in U.S. Pat. No. 6,167,156.

The search method in CHOMPS with the ORASIS prescreener accommodates the speed requirements needed to process hyperspectral data. CHOMPS with the ORASIS prescreener is a near neighbor selection method in which the first exemplar vector, i.e., the near neighbor vector, found within a pre-specified distance from the data vector is selected. As explained in more detail below, because of this selection process the near neighbor vector is not necessarily the nearest neighbor vector within the set of exemplar vectors.

IHPS provides a means for rapid detection of small, weak or hidden objects, substances, or patterns embedded in complex backgrounds, by providing a fast adaptive processing system for demixing and recognizing patterns or signatures in the data provided by certain types of "hypersensors." The IHPS hypersensor produces as its output a high dimensional vector or matrix consisting of many separate elements, each of which is a measurement of a different attribute of the system or scene under observation. A hyperspectral imaging system, in which the sensed attributes are different wavelength bands, is one example of such a hypersensor.

The IHPS system eliminates redundancy in the incoming sensor data stream, for learning purposes, as will be discussed in much greater detail below, by using a prescreener module that compares each new observed spectrum, i.e., vectors, with a set of "exemplar" or "survivor" vectors chosen from earlier data vectors. The new data vector is ignored, for signature learning purposes, if it is sufficiently similar to some exemplar, and otherwise the new vector is added to the exemplar set. Two vectors are "sufficiently similar" if the difference between them, as measured using some appropriate metric, is less than a pre-specified value, $\epsilon$. A similarity measure or distance metric appropriate when the data vectors are reflection spectra is obtained by normalizing the two vectors to unit magnitude and subtracting their dot product from 1. If the resulting number is less than $\epsilon$, the vectors are considered to "match."

ORASIS is an implementation of IHPS that uses many of the algorithms from the CHOMPS compression system and is optimized for hyperspectral data. CHOMPS provides automatic compression of hyperdata with high compression ratios and low information loss. CHOMPS matches the data vector, or candidate, with the first exemplar vector found in the search process that satisfies the match error condition, even though there may be another exemplar that is more similar to the candidate. The matching exemplar vector is thus a near neighbor of the data vector, but not necessarily the nearest neighbor, as indicated above.

A problem with current near neighbor matching methods, such as ORASIS, is that a nearer neighbor exemplar vector (i.e. an exemplar vector which better fits/matches the data vector) may exist within the set of exemplar vectors. Current methods, such as ORASIS, search the set of exemplars until a match is found; once a match occurs, the search is stopped. However, as indicated above, it is possible a better matching exemplar vector is present in the set of exemplars, yet because a "match" has been determined, the search is stopped, and the better matching exemplar vector is not found. Consequently, the compressed data may not represent the most accurate reproduction, or fidelity, of the original data vector that is possible with the current set of exemplars. As a result, the compressed data may not be acceptable where a more precise reproduction of data vector is desired or necessary.

A serious problem with current nearest neighbor search methods, such as exhaustive searches that are carried out until the nearest neighbor is determined, is that these methods are too inefficient to be effective in large, high dimensional data sets. For example, nearest neighbor methods that employ exhaustive searching simply take too long and are too inefficient to accommodate large, high dimensional data sets.

BRIEF SUMMARY OF THE INVENTION

The present invention concerns a near, nearer, or nearest depending on settings, neighbor matching and compression method in which data vectors are matched to exemplar vectors. In general, a data vector is compared to exemplar vectors contained within a subset of exemplar vectors, i.e. a set of possible exemplar vectors, to find a match. As in conventional near neighbor searches, if a match is not found, the data vector is added to the set of exemplar vectors. However, if a match is found, a probability function is used to calculate the probability that a better matching exemplar vector exists. If the calculated probability is greater than a predetermined value, the data vector is compared to additional exemplar vectors. The number of additional comparisons depends on settings and the particulars of the data.

The invention, in one form thereof, concerns a method of processing data vectors by locating near neighbors. A set of exemplar vectors is generated and sorted so that the exemplar vectors are organized according to a search criterion. An inputted data vector is compared to at least one exemplar vector of the sorted set of exemplar vectors using a matching criterion to find a first match. If no match is found, the inputted data vector is added to the set of exemplars. If a match is found, the probability that a better match exists in the sorted set of exemplars is determined. The inputted data vector is compared to an additional exemplar vector if the probability of a better matching exemplar is greater than a predetermined probability value.

The invention, in another form thereof, concerns a method of finding exemplar vectors that match input data vectors by locating near neighbors within a set of sorted exemplar vectors. The sorted set of exemplar vectors are organized according to the value of the dot product of the exemplar vectors with a first reference vector, $R_1$.

A possibility zone is made up of exemplar vectors having reference vector projections that are within a range of the inputted data vector reference vector protection (i.e. the value of the dot product of the inputted data vector with the first reference vector), whereby the possibility zone constitutes all exemplars that have the possibility of matching the inputted data vector. A starting exemplar vector is selected from the set of sorted exemplar vectors as the exemplar vector having a reference vector, $R_1$, projection, most similar to the reference vector projection of the inputted data vector. The sorted set of exemplar vectors is searched for a first match using a predetermined matching criterion. If a match is found, the probability as to whether a better match exists in the possibility zone is determined. The sorted set of exemplar vectors is searched for a better match if the probability so determined is greater than a predetermined probability value.

The invention, in yet another form thereof, is a method of processing data vectors by locating near neighbors within a set of sorted exemplar vectors organized according to a sort criterion. The method comprises selecting a decision boundary, $n_\Phi$, such that a desired probability of finding a better match is defined by a probability density function $f(\Phi)$ in the interval from $\mu_\Phi - n_\Phi \sigma_\Phi$ to $\mu_\Phi + n_\Phi \sigma_\Phi$. The parameters $\mu_\Phi$ and $\sigma_\Phi$ are determined by sampling within a possibility zone among the set of sorted exemplar vectors. The possibility zone is defined by the exemplar vectors which can possibly match an inputted data vector. The area is calculated by using a formula that uses the value of the matching criterion, $\epsilon$, and the value of the dot product between the vector and the reference vectors to determine the limits imposed on the reference vector/exemplar dot products. A starting exemplar vector is selected from the set of sorted exemplars as the exemplar vector whose projection onto a first reference vector, $R_1$, is most similar to a magnitude of the projection of the data vector onto $R_1$. The sorted set of exemplars are searched up and down the set of sorted exemplar vectors, using an alternate, zigzag search pattern, from the starting exemplar vector, until a first match is found or the boundaries of the possibility zone are reached. If a near neighbor match is found then a probability is determined as to whether a better matching exemplar exists in the possibility zone. A probability zone is defined by those exemplar vectors which are more likely than a predetermined probably to be a better match than the first match. The probability zone is then searched for a better match by first computing a value $\Phi(\delta_j, \hat{\epsilon})$ as $$\frac{\delta_j}{\sqrt{2\hat{\epsilon}}},$$

where $\delta_j$ is a projection difference associated with a current value of an exemplar vector about to be tested, and $\hat{\epsilon}$ is a similarity parameter for the best match found so far, replacing $\epsilon$ in the formula used so far. Next, the data vector is compared to an additional exemplar vector if the value $\Phi(\delta_j, \hat{\epsilon})$ is inside the decision boundary, $n_\Phi$, meaning that there is a reasonable probability of finding a better match.

The invention, in an additional form thereof, is an apparatus for processing data vectors by locating near neighbors. The apparatus comprises a sensor for receiving data vectors, a memory device for storing a set of exemplar vectors, and a processor. The processor (i) sorts the set of exemplars using a sort criterion, (ii) compares a respective data vector to at least one exemplar vector of the sorted set of exemplar vectors using a matching criterion to find a first match, (iii) determines a probability that a better match exists in the sorted set of exemplar vectors when a first match is found, and (iv) compares the data vector to an additional exemplar vector if the so determined probability is greater than a predetermined probability value.

An advantage of the present invention is an improved compression method that provides for enhanced quality of output images and a reduced rate of information loss without compromising the ability to operate in real time.

Another advantage of the present invention is a method of finding the nearest neighbor for many data vectors. The present method can be optimized by using an exhaustive search of a small "high probability zone" of contiguous vectors of a set of sorted exemplar vectors, such that a nearest neighbor is found for almost all data vectors, while staying within pre-specified error limits in every case.

A further advantage of the present invention is a method of finding nearer neighbors that improves in performance with increasing dimensional space. This is in contrast to traditional nearest neighbor search methods, which become progressively less efficient as dimension increases. The present method exploits a property of high dimensional spaces, namely that the angle between a random vector (e.g. data vector and exemplar vector) and a reference vector, $R_1$, approaches 90° with increasing vector dimension. The present method uses this property in its probability function to determine whether it is likely that a better matching exemplar vector exists after a first match is found.

It is an object of the present invention to provide a vector data compression method wherein a data vector is matched to a near neighbor exemplar vector that is selected as a best matching exemplar vector contained within a probability zone subset of all exemplar vectors.

DETAILED DESCRIPTION OF THE INVENTION

Figure 1:
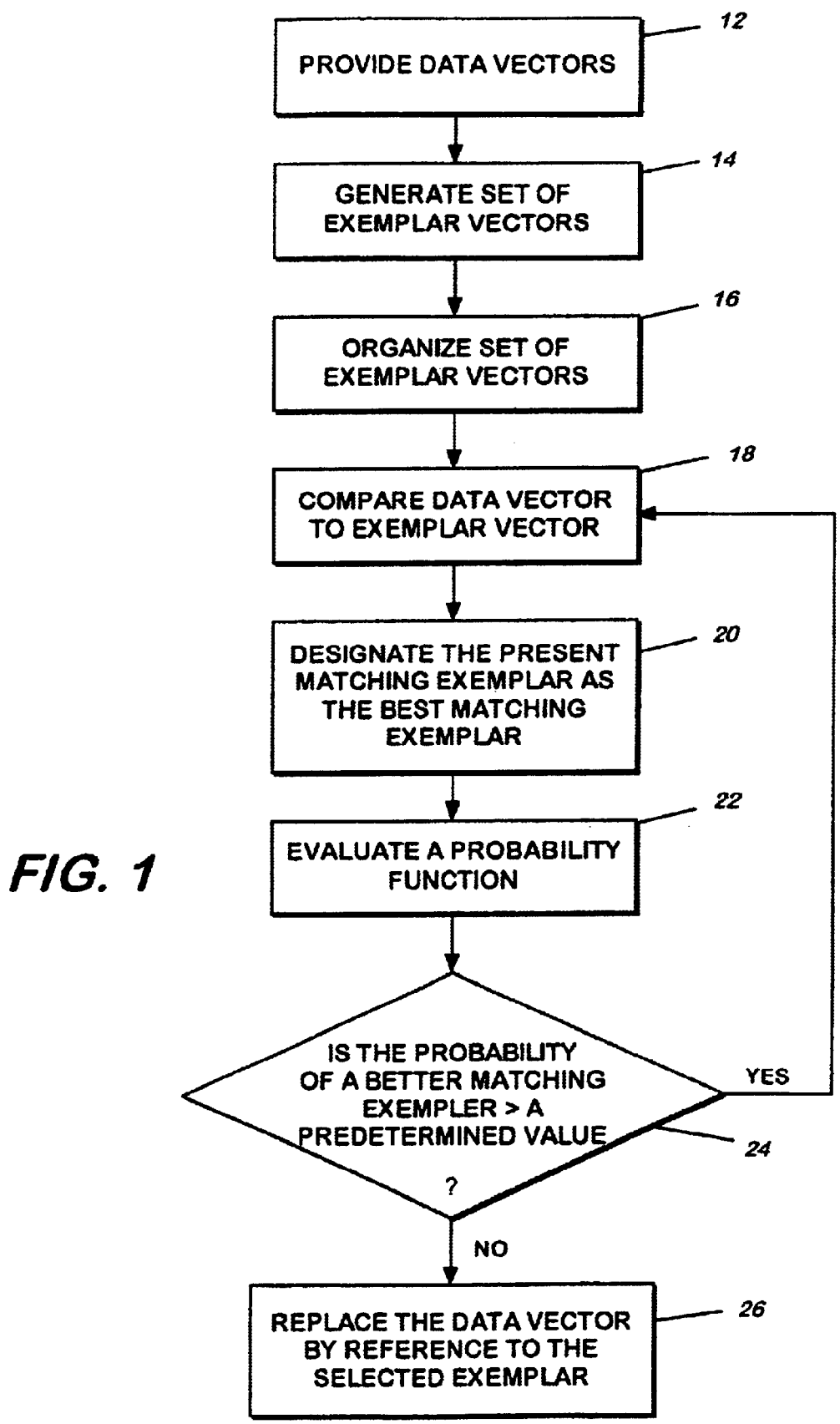
FIG. 1 is a schematic flow diagram of a near neighbor search method according to a preferred embodiment of the present invention.

Referring now to FIG. 1, a flow chart describes one preferred method that provides near neighbor searching for high dimensional data sets. As indicated in FIG. 1, as a first step, data vectors are generated through any of a number of conventional systems known in the art (block or step 12). Thereafter, from these data vectors, a set of exemplar vectors is generated (block or step 14).

Briefly considering steps 12 and 14, it will be understood that typically the set of exemplar vectors dynamically grows during the method and comprises previously generated data vectors. In a situation where there is no exemplar vector (i.e., a previous data vector) that matches a present data vector, using a predetermined matching criterion, the present data vector is added to the set of exemplars (step 14). The method by which new data vectors are added to the set of exemplars is discussed further, in greater detail, below.

The set of exemplar vectors is organized using a sort criterion (step 16). In one optimal sort criterion, at step 16, each exemplar vector is projected onto a selected normalized reference vector, e.g., vector $R_1$. The normalized exemplar vectors then are indexed and the indices sorted according to the magnitude of the corresponding exemplar vector's projection onto the reference vector $R_1$.

As indicated by block 18, each data vector is compared to at least one exemplar vector in order to find an exemplar vector that matches the data vector using a predetermined matching criterion. To do this, the data vector is first compared to a starting exemplar vector. Two vectors are "sufficiently similar" if the distance between them, measured using some appropriate metric, is less than a pre-specified value, $\epsilon$. A similarity measure, or distance metric, used when the data vectors are reflection spectra is the cosine of the angle between the vectors that is calculated by normalizing the two vectors to unit magnitude and subtracting their dot product from 1. If the resulting number is less than $\epsilon$, the vectors are considered to "match."

In the method of FIG. 1, the starting exemplar vector is selected as the exemplar vector whose $R_1$ projection value in the sorted list most closely matches the magnitude of the projection of the data vector onto $R_1$. To achieve this, a small subset of the sorted exemplar vectors is first determined as all exemplar vectors that may match the data vector. The subset includes all exemplar vectors in a "possibility zone," around the starting exemplar vector, such that the difference in the $R_1$ projections of the data vector and the exemplar vectors are sufficiently small that a match is possible.

A complete comparison proceeds as follows. The data vector's dot product with the first reference vector is compared to the sorted list of exemplars. A "possible" match is first located as an exemplar vector within the possibility zone. The "upossible" match is found by first comparing the data vector and starting exemplar vector in the reduced dimension reference space. The reduced dimension reference space is created using at least the first reference vector, $R_1$, but may also employee additional reference vectors in accordance with the CHOMPS method. The reduced space comparison has been modified from CHOMPS by adding a "reduced" dot product test. The reduced dot product is formed by first projecting each data vector and exemplar into the subspace defined by the set of all reference vectors, and calculating their residuals. The resulting "reduced" vectors (projection plus residual) are then compared by calculating their dot product. Next, if the reduced space comparison does not show that a full match" is impossible, a "full match," i.e. a full space dot product, is completed. If a "match" is found during the full space comparison, then one can move onto the probability zone and other comparisons.

The method of FIG. 1 achieves efficiency by reducing the number of full space exemplar vectors that are compared to the full space data vector. The minimization of the number of full space vector comparisons of the data vector to exemplar vectors is advantageous because vector comparisons in high dimensional spaces are computationally expensive. In addition, the use of the "possibility zone" reduces the number of exemplars that must be checked in the first place. The addition of the "reduced" dot product test improves upon the CHOMPS method by further reducing the number of full space comparisons that must be done.

If the starting exemplar vector does not match the data vector, additional exemplar vectors within the "possibility zone" will be compared to the data vector as part of step 18. The data vector is then compared to exemplar vector in the possibility zone with the next higher or next lower reference vector projection. If a match is still not found, the data vector is compared to exemplar vectors in the probability zone of the sorted list of exemplar using an alternate, zigzag, search pattern. This search pattern involves comparing the data vector alternately to exemplar vectors having a next higher reference vector projection magnitude and a next lower reference vector projection magnitude relative to the reference vector projection magnitude of the starting exemplar vector. This zigzag search pattern proceeds until a match is found or the boundaries of the possibility zone are reached.

As indicated by block 20, once a match is found, the matching exemplar vector is designated the "best" matching exemplar vector found thus far. As will be described later, if a subsequent match is later found during a subsequent step 18, as the method proceeds, the subsequent matching will be designated the "best" matching exemplar. It will become apparent that if a subsequent match is made, the subsequent matching exemplar necessarily will be a better fit than the previously matched exemplar as the matching criteria will be updated based on the previous match.

As indicated by block 22, after a match is found, a probability density function (PDF) is evaluated and a decision is rendered as shown by decision diamond 24. The PDF gives the probability that a better matching exemplar vector exists in the possibility zone. Comparisons continue when the value of the PDF is greater than a predetermined or predefined probability value, e.g., 5%. The predefined probability value is based upon several factors. These factors include, but are not limited to, the nature of the data being studied, the amount of precision that is desired by the user, and time constraints. Typically, the predefined probability value will be in the range of five percent. A PDF value greater than predetermined probability value, is indicated by the connection of the "YES" output of decision diamond 24 to block 18.

Conversely, if the probability that a better matching exemplar vector exists in the possibility zone is less than the predetermined probability value, the data vector is not compared to an additional exemplar vector. In this case, as indicated by the "NO" output of decision diamond 24, searching for a better matching exemplar vector is terminated. The data vector is then replaced by reference to the "best" matching exemplar vector as indicated in block 26.

Now turning to the PDF in more detail, the PDF provides an estimate, each time a match is found, of the probability that there is a better match inside the possibility zone. It is important to note that there is one PDF for the entire cube. The PDF is assumed to be normal (a justification for this is given later) and the parameters are "guesstimated" using the first few exemplar vectors, e.g. a hundred of so data points, and the parameters are also periodically updated. The PDF basically measures the likelihood of an additional exemplar matching a given data vector, as a function of the distance of the projected exemplar/projected data vector onto the first reference vector, $R_1$. As one "zigzags" through the possibility zone, the probability of finding a match decreases. In particular, if a match has already been made, the probability of finding a better match also decreases. The PDF provides a way of calculating the likelihood of finding a better match. Once this probability gets too small, the method stops looking for a better matching exemplar.

Because the search starts at the exemplar with the closest matching reference vector projection, the better match, if found, is further from the starting exemplars reference vector projection. In other words, the best fitting exemplar vector may not be the exemplar with the reference vector projection closest to that of the starting exemplar vector. To explain, the best matching exemplar vector can be anywhere in the possibility zone. This is true because the starting exemplar vectors and the exemplar vectors close to the data vector in the sorted list of exemplar vectors may have $R_1$ projections which are very similar to that of the data vector, but which still have large displacements from the data vector along directions orthogonal to $R_1$. Conversely, the best match could be very close to the data vector in all the orthogonal directions, but have a significant displacement in the $R_1$ direction. Thus, as stated, an exemplar vector which is further from the starting exemplar than the first match could be a better match overall. However, it is statistically more likely that the best matching exemplar is close to the starting exemplar. Thus as the attempt to match a incoming data vector gets further away from the starting exemplar, the probability of finding a better match does decrease.

Ideally, a probability function is selected or constructed which can accommodate three factors. First, ideally, the width of the probability zone should be small compared with the width of the possibility zone. Second, an appropriate statistic should be chosen that has a probability distribution that describes the distribution of data vector-exemplar vector matches, thereby defining the probability zone. Finally, the parameters of the PDF should be easily estimated from the data.

When these three factors are incorporated into the probability function, the number of exemplar vectors that must be compared to the data vector will be a small fraction of the exemplar vectors in the possibility zone. Further, by accommodating these three factors, a search method is provided that enables finding the best matching exemplar vector for a large percentage of data vectors.

By using the search method of FIG. 1, the selected matched exemplar vector will never be a worse choice than that provided by a first fit search method such as CHOMPS. Of course, the method of FIG. 1 is still a "near neighbor" method, as opposed to the nearest neighbor method, because a nearest neighbor solution is never guaranteed unless the probability threshold is set to 0. In this case the possibility zone is exhaustively searched. However, for a large percentage of data vectors, the exemplar finally selected is the nearest neighbor. The size of the possibility zone shrinks with each better matching exemplar found.

Figure 2:
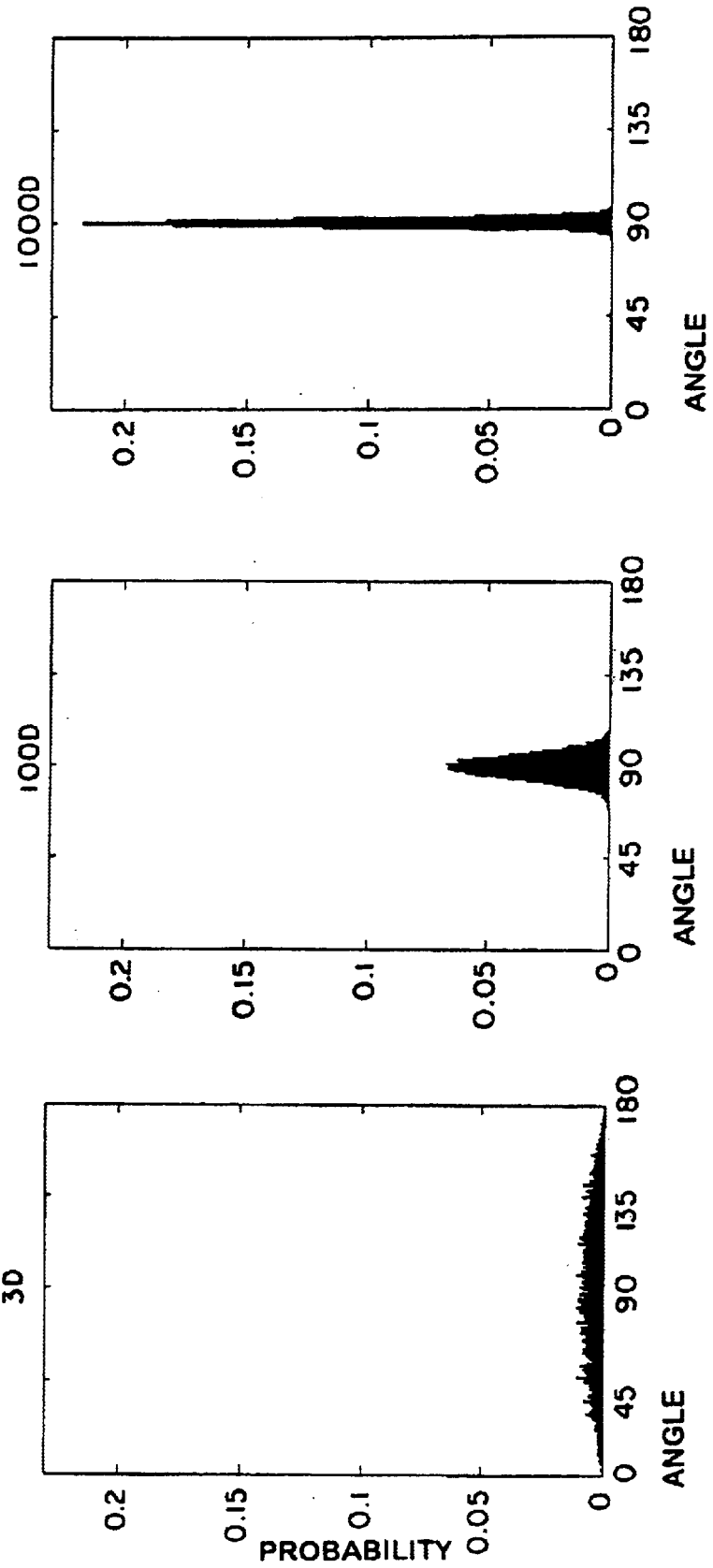
FIGS. 2(a)–2(c) are histograms plotting the angles between a fixed reference vector and randomly generated vectors, in spaces of 3, 100, and 1000 dimensions, respectively.

The expectation that the probability zone is a small fraction of the possibility zone is based on a property of high dimensional spaces. In a high dimensional space, a random vector is, with high probability, nearly orthogonal to any vector of interest, e.g., the reference vector $R_1$. To understand this, it may be helpful to refer to FIGS. 2(a) to 2(c), wherein the angle between multiple random vectors and a reference vector is plotted versus probability, for vectors having three, one hundred and one thousand dimensions, respectively. These plots were generated using several thousand randomly generated test vectors. As is observed, as the dimensions of the space increase, the angle distributions cluster ever more tightly around 90°.

It may also be helpful in understanding this concept or property, to consider a simplified, three-dimensional case involving a sphere wherein the test vectors in question are uniformly distributed over the sphere. The coordinate origin for the vectors is at the center of the sphere and the reference direction is aligned with the north pole. It should be appreciated that, in this case, there are always more random test vectors within two degrees, for example, of the equator, i.e., perpendicular or nearly perpendicular to the reference direction, than within two degrees of the north pole, i.e., parallel or nearly parallel to the reference direction. This is true because the area of a two-degree-wide equatorial "belt" provided in the former example, is greater than the area of a two-degree circle around the north pole provided in the latter example.

In higher dimensions, the scaling of the distribution with dimension can be quantitatively determined by using the central limit theorem which provides that the standard deviation of the distribution varies as the inverse square root of the dimension. In high dimensional spaces, the geometric interpretation still works: the random test vectors are uniformly distributed in space as there is "more space" nearly perpendicular to any given vector than parallel; and the magnitude of the disparity increases with dimension.

Figure 3:
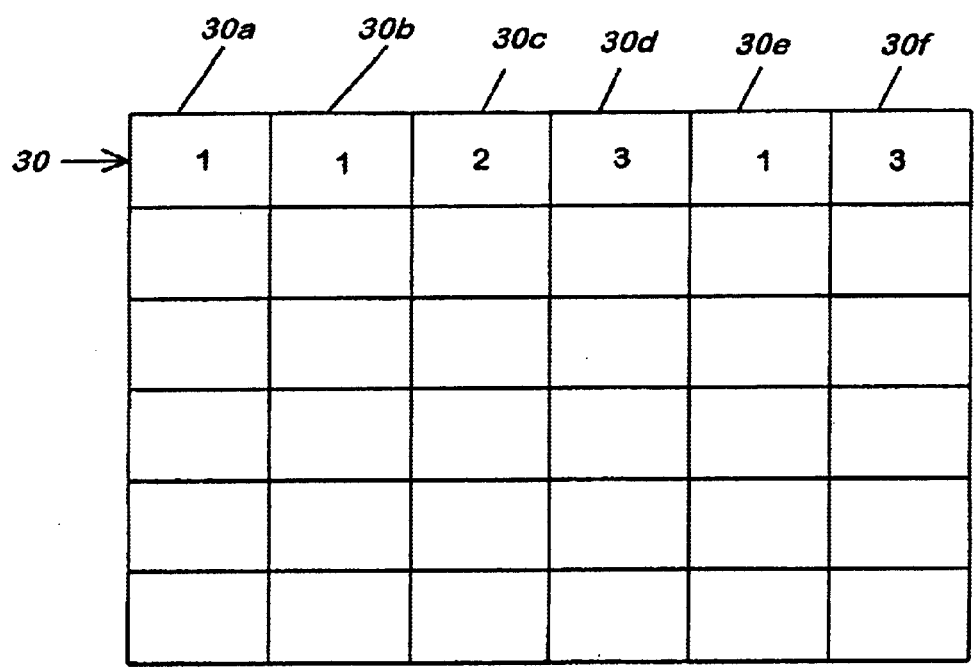
FIG. 3 is a simplified schematic of a sensor array composed of a plurality of pixels.

To assist in providing a recitation of compression achieved by the present near neighbor searching method, reference is made to a simplified sensor array 28 depicted in FIG. 3, for exemplary purposes only, and is not intended to limit the applicability of the present near neighbor searching method.

Referring now to FIG. 3, the sensor array 28 is composed of a plurality of pixels 30. Each spatial pixel 30 is associated with a high-dimensional vector. Initially, each pixel 30 is associated with a data vector. Using the search method of FIG. 1, each pixel 30 is assigned a respective matched exemplar vector. During the search method, the data vectors representing pixels 30a, 30b, 30e match exemplar vector 1. Similarly, the data vector representing pixel 30c matches exemplar vector 2 and the data vector representing pixels 30d and 30f match exemplar vector 3. Consequently, pixels 30a–30f are represented by three exemplar vectors 1, 2, 3. Compression is achieved by choosing a subset of the vectors, i.e., exemplar vectors 1, 2, 3, to represent the full dataset which comprises the pixel array 28. Pixel 30a, 30b, 30e are assigned to exemplar vector 1, pixel 30c is assigned exemplar vector 2, and pixels 30d and 30f are assigned to exemplar vector 3.

Figure 4:
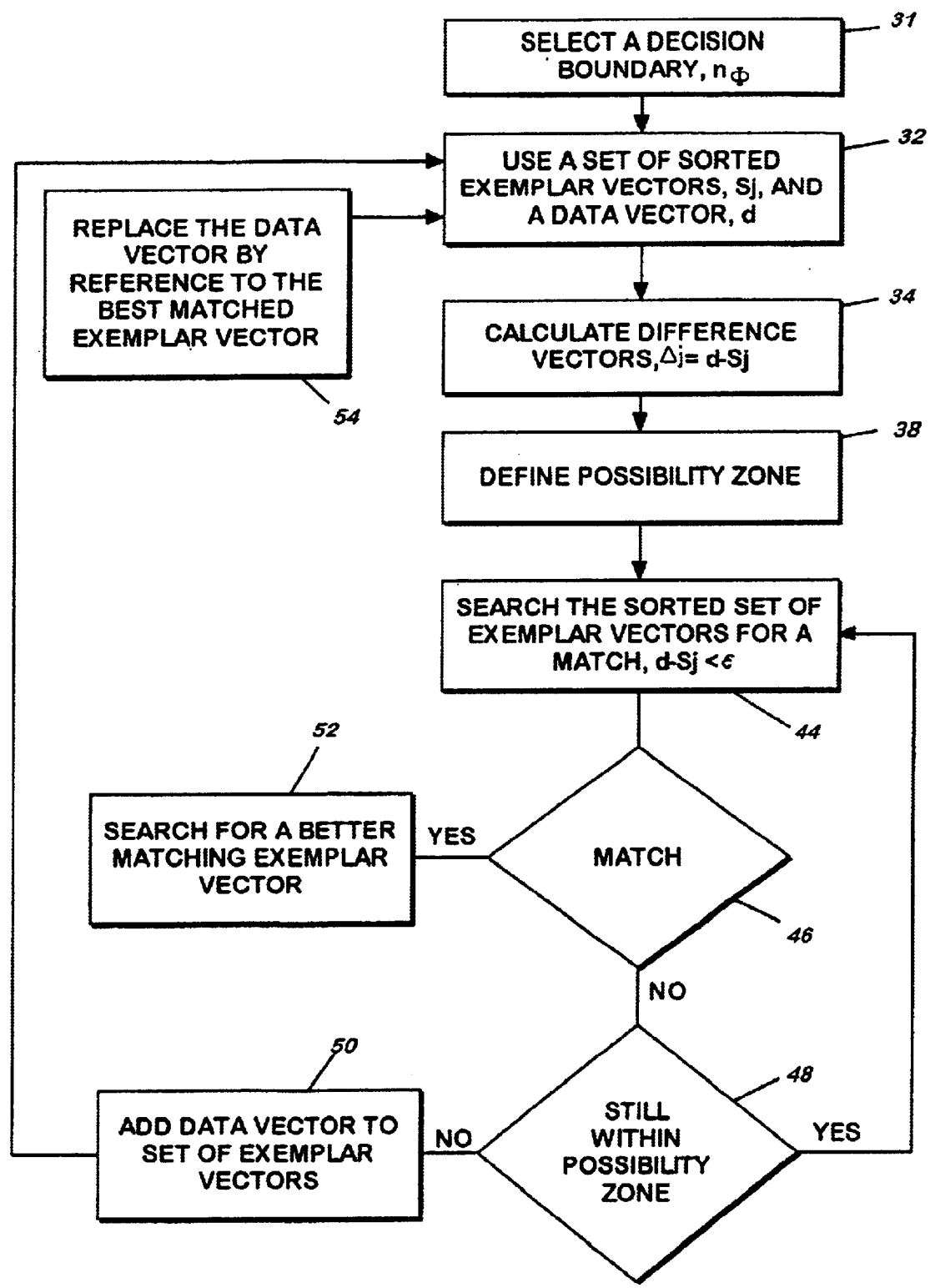
FIG. 4 is a schematic flow diagram of a further near neighbor search method according to another embodiment of the present invention.

Referring to FIG. 4, a flow diagram is shown of a near neighbor searching method in accordance with one embodiment of the present invention particularly adapted for hyperspectral applications. The method illustrated provides searching for very near neighbors of a data vector, vector d, embedded in a cloud of exemplar vectors that are distributed in a space of dimension $N_D$, where $N_D$ is large.

For each data vector d, a decision boundary, $n_\Phi$, is chosen such that the desired probability of finding a best match exemplar is the area under the probability density function $f(\Phi)$, where $\psi_j = \angle(\Delta_j, R_1)$ and $\Phi_j = \cos \psi_j = \angle(\Delta_j, R_1) = \Delta_j \cdot R_1 / |\Delta_j|$ (step 31). Specifically, the decision boundary, no, is selected such that the desired probability of finding the best match is the area under the probability density function $f(\Phi)$, in the interval from $[\mu_\Phi - n_\Phi \sigma_\Phi, \mu_\Phi + n_\Phi \sigma_\Phi]$. The upper and lower stopping points (boundaries of the probability zone) are defined by the following conditions:

$$\Phi_- \leq \Phi \leq \Phi_+, \text{ where } \Phi_+ = \mu_\Phi + n_\Phi \sigma_\Phi, \Phi_- = \mu_\Phi - n_\Phi \sigma_\Phi.$$

$n_\Phi$ is chosen (by the user). For example, if one were to want to stop when there is less than a 5% chance of finding a better match, one would set $n_\Phi = 2$, corresponding to two standard deviations from the mean. If one wishes to stop when there is ~33% chance of finding a better match, one would set $n_\Phi = 1$. It should be noted that this is based on the assumption that the distribution is normal or Gaussian. In other words, $n_\Phi$ is a parameter that determines the "desired probability" of finding a best match; it is set by the user and is the same for each incoming data vector.

The data vectors and exemplar vectors are provided (step 32) in a similar manner as in the method of FIG. 1. The exemplar vectors are indexed and the indices sorted according to the magnitude of the corresponding exemplar vector's projection onto the reference vector $R_1$. A set of difference vectors, $\Delta_j = d - S_j$, is calculated, where d is the data vector spectrum and $S_j$ is the $j^{th}$ exemplar vector, as indicated by block or step 34. In addition, the data vector is projected onto a unit reference vector, $R_1$. The projections of the data vector and the exemplar vectors are denoted by a $\alpha = d \cdot R_1$, and $\sigma_j = S_j \cdot R_1$ and, respectively.

In hyperspectral applications, the set of exemplars $\{S_j\}$ and a data vector d includes an associated noise or local scatter parameter, $\epsilon_d = 1 - \cos\theta_d$, where $\theta_d$ is the noise angle for data vector d. The subscript d indicates that these parameters may be different for each data vector. When comparing vector d to any exemplar $S_j$, the difference vector is the sum of a signal difference $\Delta_{js}$ and a noise difference, N: $d - S_j = \Delta_j = \Delta_{js} + N$.

Noise is the statistical uncertainty that exists in all measurements. In the case of hyperspectral imagers, there is noise due to the electronics of the camera (read out noise) and also some noise from photon counting statistics. Generally, in identical measurement situations the system will provide slightly different answers and this difference is noise. The noise can be accurately measured in the lab and then predicted during field measurements. Field measurements of a substance may be deter mined to be identical to with in the predicted noise level. Using mathematics, one can relate that measured noise to the parameter $\epsilon$. Ideally, when doing compression one would like to be able to do the compression such that only differences explainable by noise are lost in the compression process. And thus, it is important to get to the nearest fit possible. It is probably true that at some level of a nearer fit (if already within the noise) it makes little sense to continue.

The signal difference arises from the fact that vector d and $S_j$ have different information content. For example, in the hyperspectral application, the vectors may be spectra of different materials or different mixtures of materials. In order to have the exemplar vector count as a match, $(d - S_j)^2 \leq 2\epsilon_d$. Assuming the signal and noise differences are uncorrelated, then $\Delta_{js}^2 + N^2 \leq 2\epsilon_d$.

For values of $\epsilon_d$ much larger than $<N^2>$ (the expectation value of $N^2$), the squared magnitude of the signal difference, $\Delta_{js}^2$, may be significant for exemplars that satisfy the match condition. This implies significant information loss when an exemplar vector match, found using a conventional first match search method, replaces the data vector.

When $2\epsilon_d \sim <N^2>$, however, the observed difference between the data vector and its matching exemplar is explainable by noise, and information loss is minimized. In this parameter regime, one achieves minimum information loss under compression. Also, in this regime, the direction of the difference vector is essentially uncorrelated with $R_1$, meaning that the direction of the difference vector is, on average, equally distributed in all directions.

As indicated by block 38, a possibility zone is defined, and using a similar procedure to that of step 16 of the method of FIG. 1. The possibility zone is bounded by the largest possible projection difference where the difference vector has the maximum magnitude consistent with the matching error condition, $\epsilon$. The magnitude of the difference between the projection of the data vector and that of a given exemplar is the magnitude of the projection of the difference vector $\Delta_j$ onto $R_1$. Thus, $d \cdot R_1 - S_j \cdot R_1 = \Delta_j \cdot R_1$.

The distribution of matching exemplar vectors is controlled by the distribution of difference vector directions, and will cluster near the starting exemplar if the difference vector distribution is high dimensional and more or less uniformly distributed. While difference vectors associated with distant members of the exemplar vector set tend to exhibit correlations arising from the global structure of the data, near neighbor difference vectors tend to be randomly distributed in direction. This is especially likely if the exemplar set and/or the choice of data vector is the result of a sampling process, as is the case in the hyperspectral application. The directions of the near neighbor difference vectors are then determined more by the local scatter in the data than by the global structure of the dataset.

Moreover, for sufficiently small values of the match error parameter, $\epsilon$, the difference vector $\Delta_j$ associated with the nearest neighbor in the hyperspectral application is dominated by noise, which is always high dimensional and approximately uncorrelated with the direction of $R_1$. Therefore, the best match is, with high probability, much closer to the starting exemplar than to the outer boundary of the possibility zone. Thus, the width of probability zone is small compared to the width of the possibility zone, and this width shrinks as the dimension rises, as discussed above in connection with FIGS. 2(a)–2(c).

As indicated by block or step 44, the set of exemplar vectors within the possibility zone is searched in an effort to locate an exemplar vector that matches the data vector. This is done using the same procedure as described above in connection with step 18 of FIG. 1 and using the matching criteria described above. Beginning with the starting exemplar, the sorted list is searched using the previously described alternate, zigzag search pattern, proceeding up and down from the starting exemplar vector.

As indicated by decision diamond (step 46) the data vector is first compared to the starting exemplar vector. If the starting exemplar does not match the data vector, and the boundaries of the possibility zone are not reached as indicated by decision diamond (step 48), then the search continues, comparing the data vector to the next exemplar vector as determined by to the zigzag search pattern (step 44).

As indicated by block or step 50, if the boundaries of the possibility zone are reached and still no match is found, the exemplar vector set is amended by adding the data vector. The data vector is deemed to be unique based on the fact that no exemplar vector in the possibility zone matches the data vector. The fact that no exemplar vector in the possibility zone matched the data vector implies that none of the exemplars can match the given data vector.

The data vector is indexed and its index is added in the appropriate location to the sorted indices which correspond to the exemplar vectors, i.e. according the magnitude of the data vector's projection onto the reference vector $R_1$, (i.e. $d \cdot R_1$) (step 50). Thus, the data vector, itself is deemed the best "matched" exemplar vector. The search method of FIG. 4 may be repeated for additional data vectors, using the amended exemplar set of exemplar vectors.

However, if a first match is found (step 46), as indicated by block 52, the probability zone is searched, looking for a better match. The matching criterion, $\epsilon$, is updated, i.e., the error angle is set equal to the angle of the data and matching exemplar. Therefore, any exemplar vector that matches the data vector with its new criterion, is automatically a better, or equal, match. Finally, at step 54, the data vector is then replaced by reference to the "best" matching exemplar vector by correlating the spatial pixel associated with the data vector, with the selected exemplar vector in a manner similar to step 26.

Figure 5:
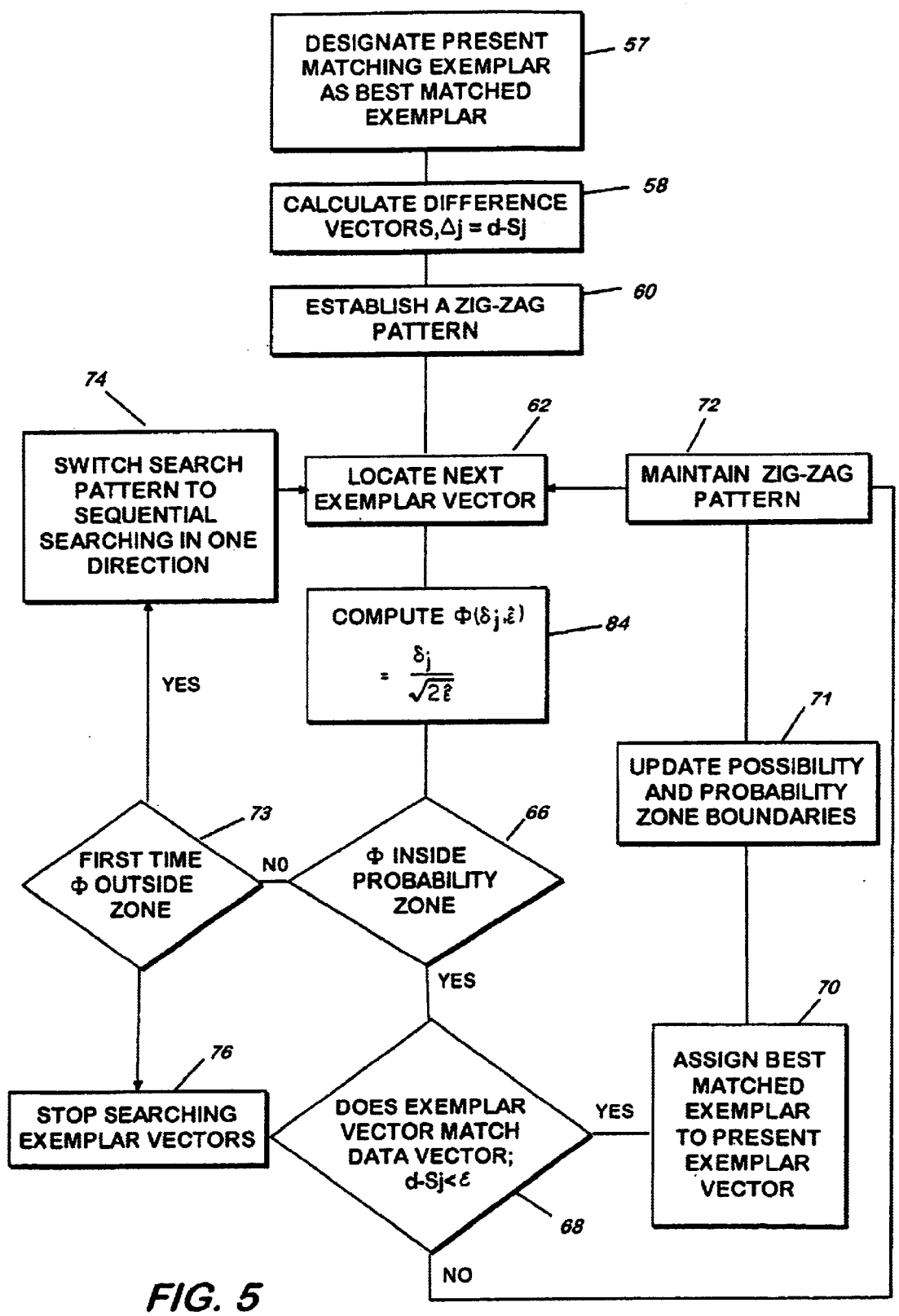
FIG. 5 is a schematic flow diagram of a method of searching for a better matching exemplar vector according to a preferred embodiment of the present invention.

Referring now to FIG. 5, there is shown a flow diagram of step 52 of FIG. 4, which involves searching for a better matching exemplar. Initially, the matched exemplar vector is designated the "best" matching exemplar vector found thus far (step 57).

A set of difference vectors, $\Delta_j = d - S_j$, is calculated, where d is the data vector spectrum and $S_j$ is the $j^{th}$ exemplar vector, as indicated by block or step 58.

The value, $\Phi$, can be expressed in terms of simple quantities that have already been computed in the course implementing the search method. As noted above, the exemplar vector list is sorted according to the value of $\sigma_j$ (i.e. $S_j \cdot R_1$) and $\delta_j = \Delta_j \cdot R_1 = \alpha - \sigma_j$.

The match condition appropriate to the hyperspectral application (reflectance spectra) is $d \cdot S_j \geq 1 - \epsilon_d$ or, equivalently $(d - S_j)^2 \leq 2\epsilon_d$. If exemplar $S_j$ satisfies the match condition, then $\epsilon_j$ is defined such that $d \cdot S_j = 1 - \epsilon_j \Rightarrow \epsilon_j = 1 - d \cdot S_j \leq \epsilon_d$.

It follows from the alternate form of the match condition that $(d - S_j)^2 = |\Delta_j|^2 = 2\epsilon_j$, which in turn implies that $|\Delta_j| = \sqrt{2\epsilon_j}$.

Since $\delta_j = (\alpha - \sigma_j) = \Delta_j \cdot R_1 = |\Delta_j| \cos \angle (\Delta_j, R_1) = |\Delta_j| \cos (\psi)$, it follows that $$\Phi_j \equiv \cos \psi_j = \frac{\delta_j}{\sqrt{2\epsilon_j}}.$$

The quantity $\delta_j$ is determined from the stored projection values, and $\delta_j$ is an immediate result of the detailed comparison between $S_j$ and d. Thus, the value of $\Phi_j$ can be obtained with little extra computation.

As one moves through the sorted exemplar vectors in a "zigzag" search pattern in a manner as described above with reference to the method of FIG. 1, outward from the starting exemplar, the quantity $\delta_j$ increases, while the value of $\epsilon_j$ associated with the best-match-so-far decreases as better matches are found. The largest magnitude of $\delta_j$ for which a match is feasible, which defines the edge of the possibility zone, is $|\delta_j| \sim \sqrt{2\epsilon_d}$, obtained when $\epsilon_j = \epsilon_d$ and $\cos \psi \sim \pm O(1)$. The actual boundaries of the possibility zone are defined by a formula that is slightly more complex than this, in the hyperspectral case, because of the normalization conditions.

The most probable values of $\Phi = \cos \psi$ are close to zero, i.e., within 2 or so standard deviations, $\sigma_{101}$, of $f(\Phi)$, the PDF for $\Phi$, calculated from best matches. Therefore the probability zone is expected to be a small fraction of the possibility zone. In most cases, the $\Phi$ distribution will be approximately Gaussian, with mean $\mu_{101}$ and standard deviation $\sigma_\Phi$, satisfying $\mu_\Phi \ll 1$ so as to establish the most probable values for matching exemplars.

The search for a better matching exemplar proceeds by establishing a zigzag search pattern (step 60), and a next exemplar vector is located for possible comparison with the data vector (step 62). The value, $\Phi(\delta_j, \hat{\epsilon})$ as $$\frac{\delta_j}{\sqrt{2\hat{\epsilon}}}$$

is computed for the next exemplar vector encountered, corresponding to the current value of $\delta_j$ (the projection difference associated with the exemplar about to be tested) and using, $\hat{\epsilon}$, the similarity parameter for the best match found so far (step 64). If $\Phi(\delta_j, \hat{\epsilon})$ is inside the probability zone (step 66), the exemplar vector is compared with the data vector (step 68). A preferred method for making this determination is to see if the boundaries of the probability zone have been exceeded. If the exemplar vector matches the data vector, the present exemplar vector is designated the "best" matching exemplar vector found thus far (step 70).

At step 71, the possibility zone and probability zone boundaries are recalculated. The matching criterion, $\epsilon$, is updated to be equal to the angle between the data vector and its matching exemplar vector. Since this new criterion is smaller than the original, the probability zone is also smaller. Thus, it is advantageous to update the probability zone boundaries. The search proceeds through the newly refined probability zone. If a new match is found during a subsequent step 68, the new match necessarily must be a better, or equal, match, since the matching criterion has been updated. Thus, the designated best "matched" exemplar will be the new match.

The $\Phi(\delta_j, \hat{\epsilon})$ value is computed at each step corresponding to the current exemplar. That value is compared to $\Phi_+$or $\Phi_-$(depending on the direction of search). In order to have a reasonable probability of finding a better match than the best match found so far the value of $\Phi$ must be in the probability zone bounded by $\Phi_+$and $\Phi_-$. When this number falls outside the probability zone, the chance of finding a better match is low and thus the search is terminated.

After the possibility zone and probability zone boundaries are updated in step 71, while maintaining the zigzag search pattern (step 72), steps 62–66 are then repeated. The zigzag search pattern is maintained, moving up and down the sorted exemplar vector list, so long as $\Phi$ is found within the probability zone. Once the value $\Phi$ is found to be not within the probability zone (step 66), it is determined whether this is the first time (is outside the probability zone (step 73).

If it is the first time $\Phi$ is outside the probability zone, the search continues in a sequential search pattern in the other direction (step 74). This approach is based on the probability that no better exemplar vector exists in the direction in question where $\Phi$ is outside the probability zone. At this point, steps 62–66 are repeated. The second time $\Phi$ is found to be outside the probability zone (step 73), the searching will stop (step 76).

As will be apparent, the upward search may halt before the downward search, or vice-versa. When both upward and downward searches have halted, the best fitting exemplar vector is correlated to the data vector, and the process is finished (see FIG. 4, step 54).

Figure 6:
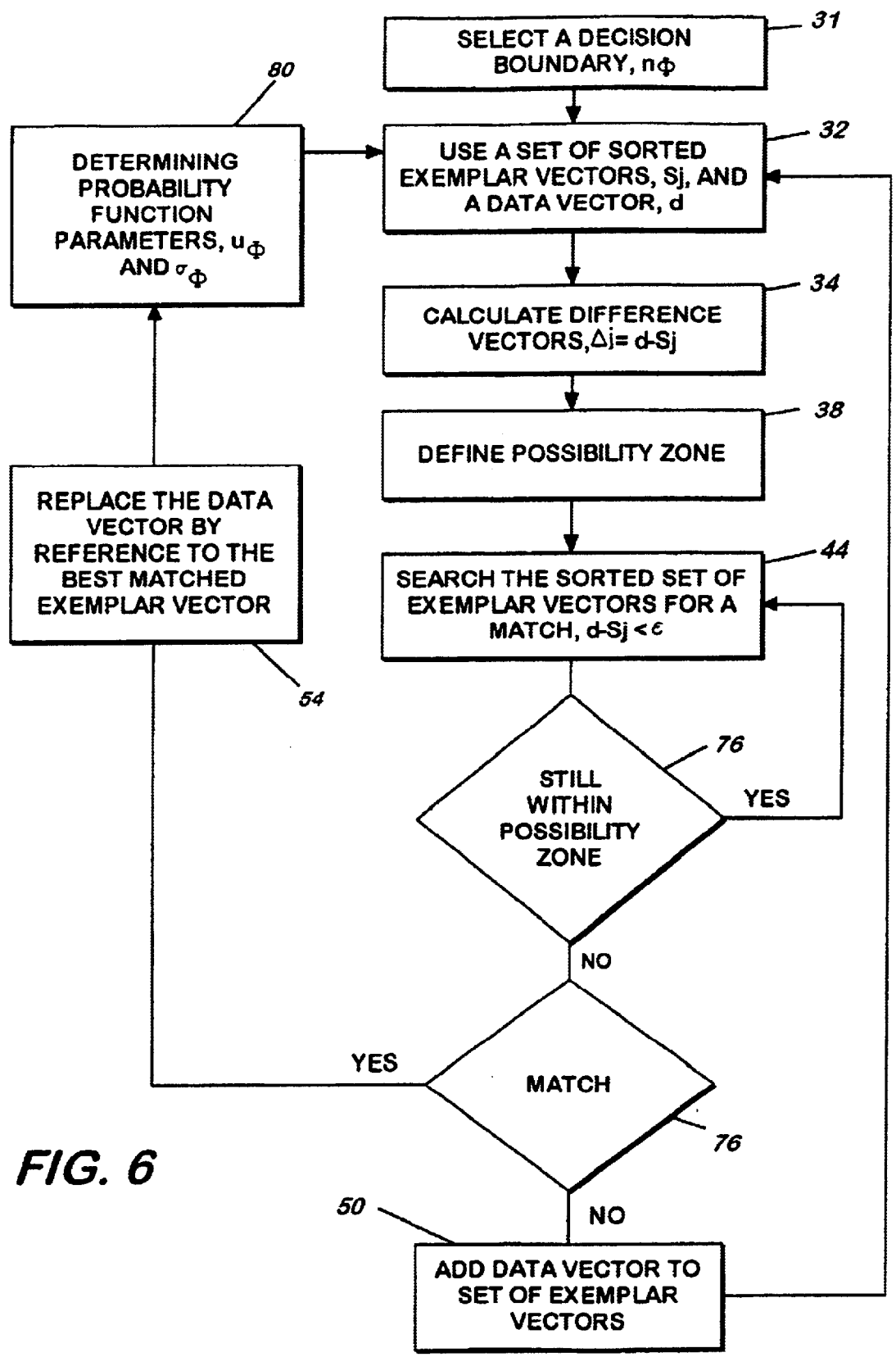
FIG. 6 is a schematic flow diagram of a method of determining probability function parameters while searching for a matching exemplar vector according to a preferred embodiment of the present invention.

For the first M data vectors and then periodically, e.g. for every $N^{th}$ data vector to be matched, the search for a matching exemplar implements the steps of the flow diagram of FIG. 6 rather than employing the flow method of FIG. 4. The steps of FIG. 6 provide for the determination of the probability function, (i.e. $\Phi$ distribution function), parameters $\mu_\Phi$ and $\sigma_\Phi$ by sampling the possibility zone. The sample may include an exhaustive search through the possibility zone in a small percentage of cases or may incorporate other searching or calculating means. As with the method of FIG. 1, these parameters are "guesstimated" from the first few data points, and then periodically updated, by an exhaustive search through the possibility zone.

Unlike the flow method of FIG. 4 which only searches for a better matching exemplar in the probability zone (step 52), the search flow of FIG. 6, proceeds in searching for a better matching exemplar while the exemplar is determined to be in the possibility zone (step 76), not just the probability zone. Once outside the possibility zone, if a match has been found (step 78), the search replaces the data vector by reference to the best matched exemplar vector (step 54). However, if no match was found (step 78), the data vector is added to the set of exemplars (step 50).

Using data collected while sampling through the possibility zone (steps 44 and 76), the distribution function parameters $\mu_\Phi$ and $\sigma_\Phi$ are determined or updated (step 80).

When the search method of FIGS. 4–6 is employed in applications with larger values of $n_\Phi$, the nearest neighbor is found in a higher percentage of cases. However, the width of the probability zone and the number of exemplar vectors to be compared to the data vector also increase. For a Gaussian probability distribution, setting $n_\Phi$ equal to 2, will find the true nearest neighbor in approximately 95% of the total population. In the course of searching, a value is computed for the $\Phi$ statistic at each step (corresponding to the $\Phi$ computation of step 64). The computed magnitude of $\Phi$ will increase monotonically as the search moves up the sorted list of exemplar vectors and decrease monotonically as the search moves down the sorted list.

The near neighbor search method of FIGS. 4–6 may be adapted for real-time applications. In such applications, the data stream is continuous, and it is ideal to have the flow method of FIG. 6 interleaved with the search process flow method of FIGS. 4 and 5, when the population statistics are unknown, a priori, and/or variable in time. In such cases, sampling of the $\Phi$ distribution may be achieved by performing an exhaustive search of the possibility zone for every $N^{th}$ candidate, where N is a number that depends on the rate of change of the statistical parameters. The parameters $\mu_\Phi$ and $\sigma_\Phi$, and their rate of change, are then continuously updated from running averages of the best fit sample values of $\Phi_j$ and $\Phi_j^2$, using the relationships: $\mu_\Phi = \langle\Phi_j\rangle$ and $\sigma_{101}^2 = \langle\Phi_j^2\rangle - \langle\Phi_j\rangle^2$, where the angular brackets indicate running average. Of course, other similar updating methods can also be used.

At the opposite extreme, in applications where the statistics of the data distribution are known in advance and stable, it may be possible to compute the PDF parameters by a more direct means.

The embodiment of near neighbor search method depicted in FIGS. 4–6, and described above is a version of a hyperspectral application. However, the present invention is adaptable in numerous other applications. Some applications which may benefit from the present method include spell checkers, search engines, and audio and video compression.

It also may be necessary to use a different, more appropriate similarity condition (distance metric). In such instances, some of the formulas and some of the other specific details described above may need to be modified. However, the core idea underlying the near neighbor search method described above which exploits the high dimensional scaling illustrated in FIGS. 2(a)–2(c) by defining probability zones in a sorted list of projections, still applies.

Figure 7:
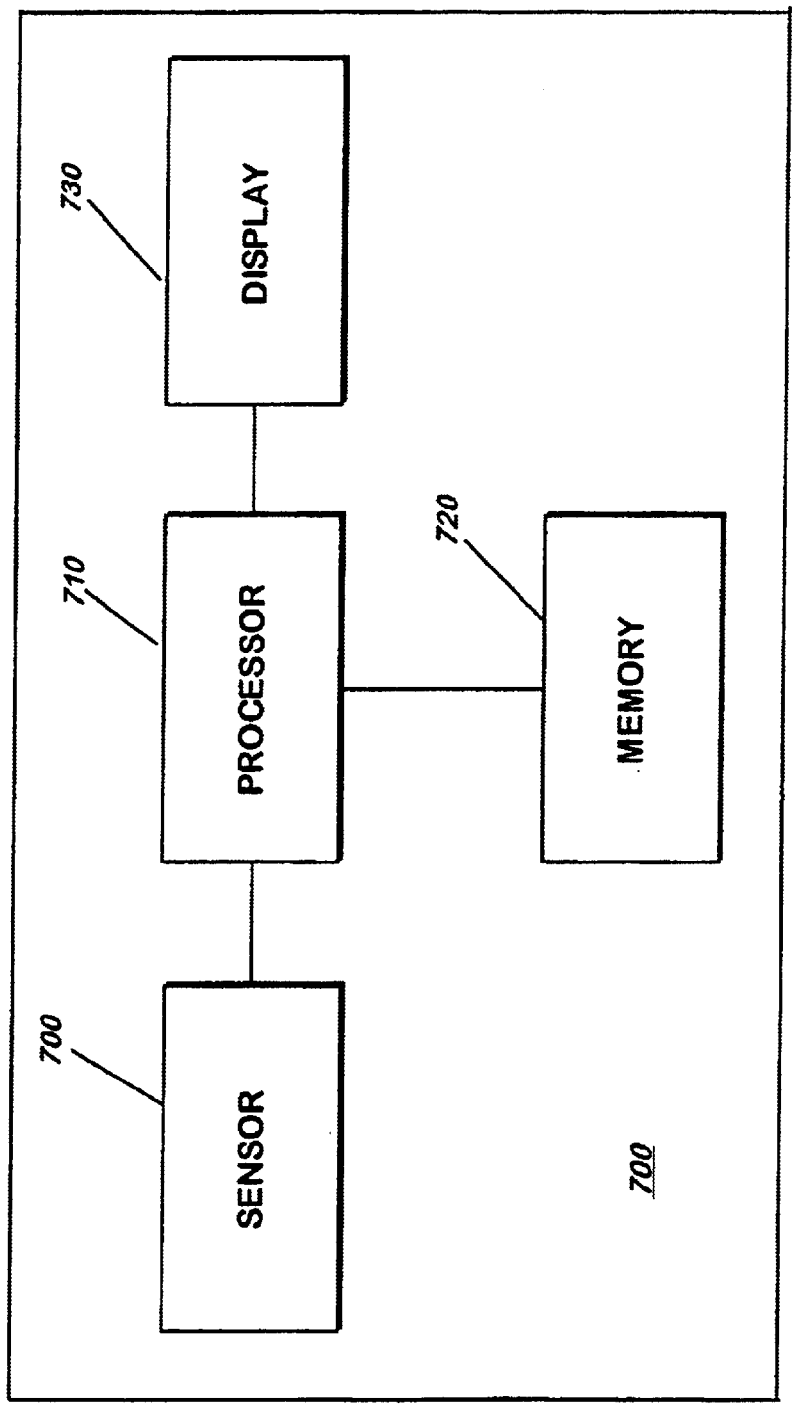
FIG. 7 is a highly schematic view of a system incorporating a near neighbor search method, in accordance with the present invention.

Referring now to FIG. 7, the various near neighbor search methods described herein, and depicted in FIG. 1 and FIG. 4, can be implemented into various hyperspectral applications such as a hyperspectral system general denoted 700. The hyperspectral sensor 710 accumulates image data where each spatial pixel is associated with a high-dimensional data vector (step 12). A processor 710 processes each data vector to find exemplar vectors which match the data vectors, by locating near neighbors within a set of sorted exemplar vectors using an appropriate search method such as the near neighbor search method of FIG. 1 or FIG. 4. Each data vector associated with each pixel is replaced by reference to a selected, matched exemplar vector stored in memory device 720. Images composed of a plurality of pixels are subsequently viewable on display 730.

As described herein, the search methods described are implemented as an extension of previous hyperspectral data compression and prescreening systems, such as CHOMPS. However, the present invention could be embodied in many other types of systems designed to solve compression, classification, and other problems where efficient near neighbor searching of high dimensional data sets is needed. Further, the present invention provides for the enhancement of processing of abstract information from hyperspectral imagery and other types of hypersensor data in real time.

Although the invention has been described above in relation to preferred embodiments thereof, it will be understood by those skilled in the art that variations and modifications can be effected in these preferred embodiments without departing from the scope and spirit of the invention.

What is claimed is:

1. A method of processing data vectors representing physical parameters by locating near neighbors, said method comprising the steps of:
   inputting data vectors;
   generating a set of exemplar vectors;
   constructing a sorted set of exemplar vectors organized according to a search criterion;
   comparing one of the inputted data vectors to at least one exemplar vector of the sorted set of exemplar vectors using a matching criterion to find a first match;
   when a first match is found, determining a probability value based on the probability that a better match exists in the sorted set of exemplar vectors, wherein said probability value is determined using a pdf analysis method;
   comparing the data vector to an additional exemplar vector if the probability value determined is greater than a predetermined probability value; and
   determining which exemplar to select to represent the data vector, wherein repetition of the steps of comparing data vectors to exemplar vectors compresses the data vectors into a set of exemplar vectors representing said physical parameters.

2. The method of claim 1, wherein the step of constructing a sorted set of exemplar vectors comprises:
   assigning a respective index to each exemplar vector;
   computing a set of reduced dimension exemplar vectors from the set of exemplar vectors by projecting each exemplar vector onto at least a first reference vector reference vector to thereby create a respective reference vector projection for each exemplar vector, each reference vector projection comprising a magnitude value; and
   organizing the indices in order based on the magnitude of the respective reference vector projection of the corresponding exemplar vector.

3. The method of claim 2, wherein the step of comparing the data vector to at least one exemplar comprises:
   generating a reduced dimension data vector by projecting the data vector onto the first reference vector; and
   locating a starting exemplar vector corresponding to the reduced dimension exemplar vector whose magnitude most closely matches the magnitude of the reduced dimension data vector.

4. The method of claim 3, wherein the step of comparing the data vector to at least one exemplar vector further comprises:
   comparing the reduced dimension data vector to the starting reduced dimension exemplar vector to determine whether the reduced dimension data vector is within a range such that it is possible that the exemplar vector matches the data vector; and
   said comparing the data vector to the exemplar vector, in fill space, only if the reduced dimension data vector is within a range such that it is possible that the exemplar vector matches the data vector.

5. The method of claim 2, wherein the step of comparing the data vector to an additional exemplar vector comprises:
   comparing the data vector to exemplar vectors of the sorted set of exemplar vectors in an alternate, zigzag search pattern, beginning with an exemplar vector having a next higher magnitude reference vector projection or a next lower magnitude reference vector projection as compared with a reference vector projection magnitude corresponding to the starting exemplar vector if the probability that a better match exists is greater than a predetermined probability value in both a still higher magnitude reference vector projection and still lower magnitude reference vector projection; or
   comparing the data vector to exemplar vectors of the sorted set of exemplar vectors in a sequential search pattern of either ever higher magnitude reference vector projection or ever lower magnitude reference vector projection if the probability that a better match exists in only a next higher magnitude reference vector projection or a next lower magnitude reference vector projection, respectively.

6. The method of claim 1 further comprises adding the data vector to the set of exemplar vectors if the data vector does not match any exemplar vector of the set exemplar vectors.

7. The method of claim 1, wherein the step of determining a probability value comprises:
   selecting a decision boundary, $n_\Phi$, such that a desired probability of finding a best match is the area under a probability density function, $f(\Phi)$, in the interval from $\mu_\Phi - n_{101}\sigma_\Phi$ to $\mu_{101} + n_{101}\sigma_\Phi$;
   determining parameters $\mu_\Phi$ and $\sigma_\Phi$ by sampling within a possibility zone of exemplar vectors, the possibility zone defined by exemplar vectors whose corresponding reference vector projection magnitude is within a predetermined difference of a magnitude of the data vector reference projection;
   searching the sorted set of exemplars alternate, sequentially, in a zigzag search pattern, from a starting exemplar vector whose corresponding reference vector projection magnitude is most similar to the magnitude of a reference vector projection of the data vector, until a first match is found or defining boundaries of the possibility zone are reached;
   searching the probability zone for a better match by computing a value $\Phi(\delta_j, \hat{\epsilon})$ as
   $$\frac{\delta_j}{\sqrt{2\hat{\epsilon}}},$$
   where $\delta_j$ is a projection difference associated with a current value of an exemplar vector about to be tested, and
   $\hat{\epsilon}$ is a similarity parameter for the best match found so far.

8. The method of claim 7, further comprises comparing the data vector to an additional exemplar vector if the value $\Phi(\delta_j, \hat{\epsilon})$ is inside the decision boundary, $n_\Phi$.

9. A method of finding exemplar vectors which match input data representing physical parameters, by locating near neighbors within a set of sorted exemplar vectors organized according to a sort criterion, said method comprising:
- selecting a decision boundary which provides a region for locating a better match based on a probability density function;
- defining a possibility zone made up of exemplar vectors having reference vector projection magnitudes differing from a magnitude of a reference vector projection of the data vector by a predetermined amount;
- selecting a starting exemplar vector from the set of sorted exemplar vector as an exemplar vector having a corresponding reference vector projection magnitude most similar to the magnitude of a reference vector projection corresponding to the selected data vector;
- searching the sorted set of exemplar vectors for a first match using a predetermined matching criterion;
- determining a probability value as to whether a better match exists in the possibility zone; searching the sorted set of exemplar vectors for a better match if the probability value so determined is greater than a predetermined probability value; and
- determining which exemplar to select to represent the data vector, wherein repetition of the steps of comparing data vectors to exemplar vectors compresses the data vectors into a set of exemplar vectors representing said physical parameters.

10. The method of claim 9, wherein said selecting the decision boundary comprises selecting a decision boundary such that a desired probability of finding a best match is the area under the probability density function $f(\Phi)$ in the interval from $\mu_\Phi - n_\Phi \sigma_\Phi$ to $\mu_\Phi + n_\Phi \sigma_\Phi$.

11. The method of claim 9, further comprising determining probability density functions parameters $\mu_\Phi$ and $\sigma_\Phi$ by sampling within a possibility zone within the set of sorted exemplar vectors.

12. The method of claim 9, wherein said searching the sorted set of exemplars for a first match comprises searching, in an alternate, zigzag search pattern, up and down the search structure of exemplar vectors, from the starting exemplar vector, until either a first match is found or defining boundaries of the possibility zone are reached.

13. The method of claim 9, wherein the step of determining a probability value comprises:
computing a value $\Phi(\delta_j, \hat{\epsilon})$ as $$\frac{\delta_j}{\sqrt{2\hat{\epsilon}}},$$

where $\delta_j$ is a projection difference associated with a current value of an exemplar vector about to be tested, and $\hat{\epsilon}$ is a similarity parameter for the best match found so far.

14. The method of claim 13, wherein the step of searching the sorted set of exemplar vectors for a better match comprises comparing the data vector to an additional exemplar vector if the value $\Phi(\delta_j, \hat{\epsilon})$ is inside the decision boundary, $n_{101}$.

15. The method of claim 9, wherein the step of searching the sorted set of exemplar vectors for a better match comprises searching the possibility zone in a zigzag search pattern until either an upper or a lower probability boundary limit is exceeded, and depending on which boundary limit is exceeded, then searching the possibility zone in a sequential pattern moving up the search structure or down the search structure toward the boundary limit not exceeded.

16. The method of claim 15, further comprising:
assigning the data vector to the best matching exemplar vector.

17. A method of processing data vectors associated with respective spatial pixels by locating near neighbors within a set of sorted exemplar vectors organized according to a sort criterion, said method comprising:
- selecting a decision boundary, $n_\Phi$, such that a desired probability of finding a best match is related to an area defined by the corresponding probability density function $f(\Phi)$ in the interval from $\mu_\Phi - n_\Phi \sigma_\Phi$ to $\mu_\Phi + n_\Phi \sigma_\Phi$;
- determining parameters $\mu_\Phi$ and $\sigma_\Phi$ by sampling within a possibility zone, among the set of sorted exemplar vectors, the possibility zone being defined by exemplars vectors whose corresponding reference vector projection magnitude is within a predetermined difference of a magnitude of a reference vector projection of the data vector;
- selecting a starting exemplar vector from the set of sorted exemplars as an exemplar vector whose corresponding reference vector projection magnitude is most similar to a magnitude of a reference vector projections of the data vector;
- searching the sorted set of exemplars alternately and sequentially up and down the search structure of exemplar vectors, in a zigzag search pattern, beginning from the starting exemplar vector, until a first match is found or boundaries of the possibility zone are reached;
- searching the probability zone for a better match by computing a value $\Phi(\delta_j, \hat{\epsilon})$ as $$\frac{\delta_j}{\sqrt{2\hat{\epsilon}}},$$

where $\delta_j$ is a projection difference associated with a current value of an exemplar vector about to be tested, and $\hat{\epsilon}$ is a similarity parameter for the best match found so far; comparing the data vector to an additional exemplar vector if the value $\Phi(\delta_j, \hat{\epsilon})$ is inside the decision boundary, $n_\Phi$; and

- determining which exemplar to select to represent the data vector wherein repetition of the steps of comparing data vectors to exemplar vectors compresses the data vectors into a set of exemplar vectors associated with said spatial pixels.

18. The method of claim 17, wherein said searching the probability zone further comprises searching the probability zone in said zigzag search pattern until an upper or lower probability boundary limit is exceeded, and then searching the probability zone in a sequential pattern moving up the search structure or down the search structure depending on the boundary that has been exceeded.

19. The method of claim 18, further comprising:
assigning the respective spatial pixel associated with the data vector to the best matching exemplar vector.

20. An apparatus for processing data vectors by locating near neighbors, said apparatus comprising:
- a sensor for measuring a physical environment and generating a plurality of data vectors representing parameters in said physical environment;
- a memory device for storing a set of exemplar vectors; and
- a processor for:
  i. sorting the set of exemplars using a sort criterion,
  ii. comparing a respective data vector to at least one exemplar vector of the sorted set of exemplar vectors using a matching criterion to find a first match, iii. determining a probability value based on the probability that a better match exists in the sorted set of exemplar vectors when a first match is found, wherein said probability value is determined using a pdf analysis method;

iv. comparing the selected data vector to an additional exemplar vector if the probability value determined is greater than a predetermined probability value; and determining which exemplar to select to represent the data vector, wherein repetition of the steps of comparing data vectors to exemplar vectors compresses the data vectors into a set of exemplar vectors representing said parameters in said physical environment.

21. The apparatus of claim 20, wherein said processor constructs a sorted set of exemplar vectors by computing a set of reduced dimension exemplar vectors from the set of exemplar vectors by projecting each exemplar vector onto a reference vector, each reduced dimension exemplar vector comprising a magnitude value.

22. The apparatus of claim 21, wherein said processor compares the data vector to at least one exemplar by generating a reduced dimension data vector by projecting the data vector onto the reference vector, calculating a magnitude for the reduced dimension data vector, and locating a starting exemplar vector corresponding to the exemplar vector whose magnitude of projection onto the reference vector most closely matches the magnitude of the projection of the data vector onto the reference vector.

23. The apparatus of claim 22, wherein said processor compares the data vector to at least one exemplar vector further comprises comparing the reduced dimension data vector to the starting reduced dimension exemplar vector to determine whether the reduced dimension data vector is within a predetermined range measured from the starting reduced dimension exemplar vector; and compares the data vector to the exemplar vector only if the reduced dimension data vector is within the predetermined range measured from the starting reduced dimension exemplar vector.

24. The apparatus of claim 22, wherein said processor compares the data vector to an additional exemplar vector, after the first match is found, if a reference vector projection of the data vector and a reference vector projection of the exemplar vector differ in magnitude by an amount less than a predetermined value.

25. The apparatus of claim 24, wherein said processor compares the data vector to an additional exemplar vector by:

i. comparing the data vector to exemplar vectors of the sorted set of exemplar vectors in an alternate, zigzag search pattern, beginning with an exemplar vector having next higher a reference vector projection magnitude and next lower reference vector projection magnitude as compared with a reference vector projection magnitude of the starting exemplar vector if the probability that a better match exists is greater than a predetermined probability value in both a still higher magnitude reference vector projection exemplar vector and still lower magnitude reference vector projection exemplar vector; or ii. comparing the data vector to exemplar vectors of the sorted set of exemplar vectors in a sequential search pattern of either ever higher magnitude reference vector projections of the exemplar vectors or ever lower magnitude reference vector projections of the exemplar vectors if the probability that a better match exists in only a next higher magnitude reference vector projection exemplar vector or a next lower magnitude reference vector projection exemplar vector, respectively.

26. The apparatus of claim 25, wherein said processor adds the data vector to the set of exemplar vectors stored in said memory device if the data vector does not match any exemplar vector of the set exemplar vectors.

* * * * *